United States Patent
Moravek et al.

(10) Patent No.: US 10,304,344 B2
(45) Date of Patent: May 28, 2019

(54) METHODS AND SYSTEMS FOR SAFE LANDING AT A DIVERSION AIRPORT

(71) Applicant: HONEYWELL INTERNATIONAL INC., Morris Plains, NJ (US)

(72) Inventors: Zdenek Moravek, Rozdrojovice (CZ); David Kunes, Tisnov (CZ); Filip Magula, Albrechtice (CZ); Robert Sosovicka, Brno (CZ); Katerina Sprinarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 596 days.

(21) Appl. No.: 15/019,650

(22) Filed: Feb. 9, 2016

(65) Prior Publication Data
US 2017/0229024 A1 Aug. 10, 2017

(51) Int. Cl.
*G08G 5/00* (2006.01)
*G01C 21/20* (2006.01)
(Continued)

(52) U.S. Cl.
CPC .......... *G08G 5/0039* (2013.01); *G01C 21/20* (2013.01); *G01C 23/00* (2013.01); *G08G 5/0013* (2013.01);
(Continued)

(58) Field of Classification Search
CPC .. G08G 5/0039; G08G 5/0047; G08G 5/0013; G08G 5/0021; G08G 5/0091; G08G 5/025; G01C 21/20; G01C 23/00
See application file for complete search history.

(56) References Cited

U.S. PATENT DOCUMENTS 5,398,186 A   3/1995 Nakhla
5,842,142 A   11/1998 Murray et al.
(Continued)

FOREIGN PATENT DOCUMENTS

EP   2317488 A2   5/2011
EP   2355071 A1   8/2011
(Continued)

OTHER PUBLICATIONS

Extended EP Search Report for Application No. 17152945.6-1803/3208787 dated Nov. 7, 2017.
(Continued)

*Primary Examiner* — Tuan C To
(74) *Attorney, Agent, or Firm* — Lorenz & Kopf, LLP

(57) ABSTRACT

Methods and systems are provided for generating a route that facilitates navigating a vehicle to a diversion destination while satisfying applicable safety thresholds or other constraints, such as a maximum landing weight. One exemplary method of facilitating an aircraft landing at a diversion airport involves obtaining a current position of the aircraft, identifying a landing threshold influenced by a characteristic of the aircraft, obtaining one or more constraints associating with diverting to the diversion airport, and determining a route from the current position to the diversion airport based at least in part on the landing threshold and the one or more constraints. The route satisfies the constraints and results in a predicted value for the aircraft, e.g., a predicted aircraft landing weight, that satisfies the landing threshold. A graphical representation of the route is displayed on a display device onboard the aircraft.

16 Claims, 11 Drawing Sheets

(51) Int. Cl.
*G01C 23/00* (2006.01)
*G08G 5/02* (2006.01)

(52) U.S. Cl.
CPC ......... *G08G 5/0021* (2013.01); *G08G 5/0047* (2013.01); *G08G 5/0091* (2013.01); *G08G 5/025* (2013.01)

(56) References Cited

U.S. PATENT DOCUMENTS

| | | | |
|---|---|---|---|
| 6,199,008 B1 | 3/2001 | Aratow et al. | |
| 6,381,535 B1 | 4/2002 | Durocher et al. | |
| 6,542,796 B1 | 4/2003 | Gibbs et al. | |
| 7,342,514 B1 | 3/2008 | Bailey et al. | |
| 7,499,771 B2 | 3/2009 | Caillaud | |
| 7,796,055 B2 | 9/2010 | Clark et al. | |
| 7,908,078 B2 | 3/2011 | He | |
| 7,963,618 B2 | 6/2011 | Stone et al. | |
| 7,996,121 B2 | 8/2011 | Ferro et al. | |
| 8,010,242 B1 | 8/2011 | Ginsberg et al. | |
| 8,026,831 B2 | 9/2011 | Muramatsu et al. | |
| 8,112,186 B2 | 2/2012 | Sylvester | |
| 8,121,747 B2* | 2/2012 | Loots | G01C 23/005 244/175 |
| 8,135,500 B1 | 3/2012 | Robinson | |
| 8,200,378 B1 | 6/2012 | Chiew et al. | |
| 8,214,136 B2 | 7/2012 | Caillaud | |
| 8,292,234 B2 | 10/2012 | Shuster | |
| 8,521,343 B2 | 8/2013 | Spinelli | |
| 8,554,457 B2 | 10/2013 | White et al. | |
| 8,565,944 B1* | 10/2013 | Gershzohn | G08G 5/0039 701/1 |
| 8,612,070 B2 | 12/2013 | Geoffroy et al. | |
| 8,615,337 B1 | 12/2013 | McCusker et al. | |
| 8,666,649 B2 | 3/2014 | Otto et al. | |
| 8,676,481 B2 | 3/2014 | Coulmeau et al. | |
| 8,700,249 B1* | 4/2014 | Carrithers | G06Q 10/047 701/25 |
| 8,723,686 B1 | 5/2014 | Murray et al. | |
| 8,849,478 B2 | 9/2014 | Coulmeau et al. | |
| 9,047,769 B2 | 6/2015 | Lafon et al. | |
| 9,064,407 B2 | 6/2015 | Otto et al. | |
| 9,098,996 B2 | 8/2015 | Barraci et al. | |
| 9,257,048 B1* | 2/2016 | Offer | G08G 5/0021 |
| 9,310,222 B1 | 4/2016 | Suiter et al. | |
| 9,423,799 B1 | 8/2016 | Wu et al. | |
| 9,500,488 B2* | 11/2016 | Rosswog | G01C 21/3415 |
| 9,567,099 B2 | 2/2017 | Poux et al. | |
| 9,640,079 B1 | 5/2017 | Moravek et al. | |
| 9,646,503 B2 | 5/2017 | Kawalkar et al. | |
| 2004/0030465 A1 | 2/2004 | Conner et al. | |
| 2004/0073571 A1* | 4/2004 | Kumhyr | G08G 1/005 |
| 2005/0049762 A1 | 3/2005 | Dwyer | |
| 2006/0025901 A1 | 2/2006 | Demortier et al. | |
| 2007/0050098 A1 | 3/2007 | Caillaud | |
| 2007/0078591 A1 | 4/2007 | Meunier et al. | |
| 2007/0241936 A1 | 10/2007 | Arthur et al. | |
| 2007/0299598 A1 | 12/2007 | Fetzmann et al. | |
| 2008/0110005 A1 | 1/2008 | Small et al. | |
| 2008/0300737 A1 | 12/2008 | Sacle et al. | |
| 2009/0043434 A1* | 2/2009 | Deker | G05D 1/0676 701/16 |
| 2009/0150012 A1 | 6/2009 | Agam et al. | |
| 2009/0171560 A1 | 7/2009 | McFerran et al. | |
| 2010/0036552 A1 | 2/2010 | Pepitone et al. | |
| 2010/0161156 A1 | 6/2010 | Coulmeau et al. | |
| 2010/0194601 A1 | 8/2010 | Servantie et al. | |
| 2010/0198433 A1 | 8/2010 | Fortier et al. | |
| 2011/0077859 A1* | 3/2011 | Coulmeau | G05D 1/101 701/465 |
| 2011/0264312 A1 | 10/2011 | Spinelli et al. | |
| 2012/0218127 A1 | 8/2012 | Kroen | |
| 2012/0245836 A1 | 9/2012 | White et al. | |
| 2013/0001355 A1 | 1/2013 | Cox et al. | |
| 2013/0046422 A1 | 2/2013 | Cabos | |
| 2013/0090842 A1 | 4/2013 | Stabile | |
| 2013/0103297 A1 | 4/2013 | Bilek et al. | |
| 2013/0179011 A1 | 7/2013 | Colby et al. | |
| 2013/0179059 A1 | 7/2013 | Otto et al. | |
| 2013/0204470 A1 | 8/2013 | Luckner et al. | |
| 2013/0218374 A1 | 8/2013 | Lacko et al. | |
| 2013/0271300 A1 | 10/2013 | Pepitone et al. | |
| 2013/0304349 A1 | 11/2013 | Davidson | |
| 2014/0278056 A1 | 9/2014 | Williams et al. | |
| 2014/0309821 A1* | 10/2014 | Poux | G08G 5/0021 701/14 |
| 2014/0343765 A1 | 11/2014 | Suiter et al. | |
| 2014/0350753 A1 | 11/2014 | Depape et al. | |
| 2015/0015421 A1* | 1/2015 | Krijger | G08G 1/0129 340/932 |
| 2015/0081197 A1 | 3/2015 | Gaertner et al. | |
| 2015/0120098 A1 | 4/2015 | Catalfamo et al. | |
| 2015/0142222 A1* | 5/2015 | Choi | G08G 5/0034 701/3 |
| 2015/0241295 A1 | 8/2015 | Fuscone et al. | |
| 2015/0279218 A1* | 10/2015 | Irrgang | G08G 5/0039 701/3 |
| 2015/0371544 A1 | 12/2015 | Mere | |
| 2016/0063867 A1* | 3/2016 | Zammit | G08G 5/0039 701/18 |
| 2016/0085239 A1 | 3/2016 | Boyer et al. | |
| 2016/0116917 A1 | 4/2016 | Bataillon et al. | |
| 2016/0196525 A1* | 7/2016 | Kantor | G08G 5/0013 705/330 |
| 2016/0229554 A1 | 8/2016 | Kawalkar et al. | |
| 2016/0236790 A1* | 8/2016 | Knapp | B64C 11/001 |
| 2017/0032683 A1* | 2/2017 | Meserole, Jr. | G08G 5/0043 |
| 2017/0154537 A1 | 6/2017 | Moravek et al. | |
| 2017/0168658 A1* | 6/2017 | Lacko | G01C 23/005 |
| 2017/0178518 A1* | 6/2017 | Foladare | G08G 5/0034 |
| 2017/0229024 A1 | 8/2017 | Moravek et al. | |
| 2017/0320589 A1 | 11/2017 | Moravek et al. | |

FOREIGN PATENT DOCUMENTS

| | | |
|---|---|---|
| EP | 1963888 B1 | 1/2013 |
| EP | 2574965 A2 | 4/2013 |
| EP | 2657922 A2 | 10/2013 |
| EP | 2657923 A2 | 10/2013 |
| EP | 2790168 A2 | 10/2014 |
| EP | 2800082 A2 | 11/2014 |
| EP | 2980774 A1 | 2/2016 |
| GB | 1153847 A | 5/1969 |
| WO | 01/57828 A1 | 8/2001 |
| WO | 2007006310 A2 | 1/2007 |
| WO | 2012145608 A1 | 10/2012 |
| WO | 2013162524 A1 | 10/2013 |

OTHER PUBLICATIONS

Extended EP Search Report for Application No. 16197629.5-1803 dated Jul. 4, 2017.
ForeFlight Mobile Product Page Nov. 19, 2015; Reference Notes Last accessed at http://foreflight.com/products/foreflight-mobile.
AVPlan EFB Plan Faster, Fly Sooner Nov. 19, 2015; Reference Notes Last accessed at http://www.avplan-efb.com/avplan.
AivlaSoft Electronic Flight Bag—Cockpit efficiency and situational awareness Nov. 19, 2015; Reference Notes Last accessed at http://www.aivlasoft.com/index.html.
Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.
Stackexchange aviation http://aviationstackexchange.com/ Dec. 31, 2014; Reference Notes http://aviation.stackexchange.com/questions/2854/when-are-aircraft-required-to-dump-fuel-for-emergency-landings.
What to Consider Overweight Landing? aero quarterly Dec. 31, 2007; Reference Notes http://www.boeing.com/commercial/aeromagazine/articles/qtr_3_07/AERO_Q307_article3.pdf.

(56) References Cited

OTHER PUBLICATIONS

USPTO Office Action for U.S. Appl. No. 15/047,355 dated Oct. 16, 2017.
Extended EP Search Report for Application No. 17152071.1-1557 dated Jul. 3, 2017.
USPTO Office Action for U.S. Appl. No. 15/145,346 dated Jun. 14, 2017.
USPTO Office Action for U.S. Appl. No. 14/953,635 dated Jun. 19, 2017.
USPTO Restriction Requirement for U.S. Appl. No. 15/047,355 dated Jun. 19, 2017.
FlightGear Forum; Using a Canvas Map in the GUI; 2012.
Automated Ceiling Reports ForeFlight; 2015.
Pad Pilot News; 10 tips to increase your runway awareness with ForeFlight; 2015.
Moravek, Z. et al.; Methods and Systems for Presenting Diversion Destinations; Filed on Nov. 30, 2015 and assigned U.S. Appl. No. 14/953,635.
Moravek, Z. et al.; Methods and Systems Facilitating Stabilized Descent to a Diversion Airport; Filed on Feb. 18, 2016 and assigned U.S. Appl. No. 15/047,355.
Moravek, Z. et al. Methods and Systems for Safe Landing at a Diversion Airport; Filed on Feb. 9, 2016 and assigned U.S. Appl. No. 15/019,650.
Moravek, Z. et al.; Methods and Systems for Conveying Destination Viability; Filed on May 3, 2016 and assigned U.S. Appl. No. 15/145,346.
Chmelarova et al.; Methods and Systems for Presenting En Route Diversion Destinations; Filed on Sep. 7, 2016 and assigned U.S. Appl. No. 15/258,400.
Moravek, Z. et al.; Flight Plan Segmentation for En Route Diversion Destinations; Filed on Nov. 21, 2016 and assigned U.S. Appl. No. 15/357,086.
Haroon, K; FMC Alternate Airport and Diversion; The Airline Pilots Forum & Resource, 2012.
Atkins, E.M. et al.; Emergency Flight Planning Applied to Total Loss of Thrust; Journal of Aircraft vol. 43, No. 4, Jul.-Aug. 2006.
Moravek, Z. et al.; Methods and Systems Facilitating Holding for an Unavailable Destination; Filed on Feb. 9, 2016 and assigned U.S. Appl. No. 15/019,675.
Partial EP Search Report for Application No. 17152945.6-1803 dated Jul. 7, 2017.
Extended EP Search Report for Application No. 17151896.2-1557 dated Nov. 7, 2017.
USPTO Notice of Allowance for U.S. Appl. No. 15/019,675 dated Jan. 26, 2017.
Extended EP Search Report for Application No. 17164877.7 dated Feb. 13, 2018.
Partial EP Search Report for Application No. 17164877.7-1803 dated Sep. 26, 2017.
USPTO Notice of Allowance for U.S. Appl. No. 15/145,346 dated Sep. 27, 2017.
USPTO Office Action for U.S. Appl. No. 15/258,400 dated Dec. 14, 2017.
USPTO Office Action for U.S. Appl. No. 14/953,635 dated Dec. 28, 2017.

\* cited by examiner

METHODS AND SYSTEMS FOR SAFE LANDING AT A DIVERSION AIRPORT

TECHNICAL FIELD

The subject matter described herein relates generally to vehicle systems and related displays, and more particularly, embodiments of the subject matter relate to aircraft systems capable of facilitating safe operation with respect to landing at a diversion destination in a manner that reduces a pilot's workload.

BACKGROUND

In situations where an aircraft needs to deviate from an original flight plan, such as an emergency situation, numerous pieces of flight-related information need to be analyzed with respect to the deviation as quickly as possible to facilitate continued safe operation. For example, the amount of fuel remaining onboard with respect to the distance to be traveled to a diversion destination, current and/or forecasted meteorological information with respect to traversing that distance, the current aircraft configuration and/or the current status of various aircraft systems (e.g., engine status, landing gear status, or the like), landing constraints for the aircraft model and/or the available runways at the diversion destination, along with other pieces of information (e.g., notice to airmen (NOTAM) messages, significant meteorological information (SIGMET) messages, pilot reports (PIREPs), and the like). This numerous pieces of information are often distributed across different displays or instruments, requiring the pilot to mentally piece together all the different information from the different sources. Moreover, the time-sensitive nature of the aircraft operation in an emergency situation can increase the stress on the pilot, which, in turn, increases the likelihood of pilot error. Accordingly, it is desirable to reduce the mental workload of the pilot (or air traffic controller, or the like) and better facilitate safe operation for an aircraft diverting from its original flight plan.

BRIEF SUMMARY

Methods and systems are provided for facilitating a vehicle arriving at a destination while satisfying applicable safety thresholds or other criteria, such as an aircraft landing at an airport while satisfying maximum landing weight criteria. One exemplary system includes a display device to display a map associated with a vehicle, an input device to obtain one or more constraints for diverting the vehicle, and a processing system coupled to the display device and the input device. The processing system determines a route from a current position of the vehicle to a diversion destination based at least in part on a safety threshold for accessing the diversion destination and the one or more constraints and displays a graphical representation of the route on the map. The route satisfies the one or more constraints and results in a predicted value for a characteristic of the vehicle satisfying the safety threshold at the diversion destination.

In another embodiment, a method of facilitating an aircraft landing at a diversion airport involves obtaining a current position of the aircraft, identifying a landing threshold influenced by a characteristic of the aircraft, obtaining one or more constraints associating with diverting to the diversion airport, determining a route from the current position to the diversion airport that satisfies the one or more constraints based at least in part on the landing threshold and the one or more constraints, and displaying a graphical representation of the route on a display device.

Another exemplary method involves obtaining, from a first system onboard a vehicle, a current position of the vehicle, obtaining, from a second system onboard the vehicle, a current value for a characteristic of the vehicle, obtaining one or more constraints associating with diverting to a diversion destination, generating a viable route region comprising a plurality of navigational reference points between the vehicle and the diversion destination based at least in part on the one or more constraints, and determining a route from the current position to the diversion destination that results in a predicted value for the vehicle satisfying a threshold. Determining the route involves initially determining the route using the viable route region, determining the predicted value based at least in part on the current value for the characteristic and the route, and iteratively adjusting one or more points of the route until the predicted value satisfies the threshold. The method continues by providing indication of the route to a third system onboard the vehicle.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
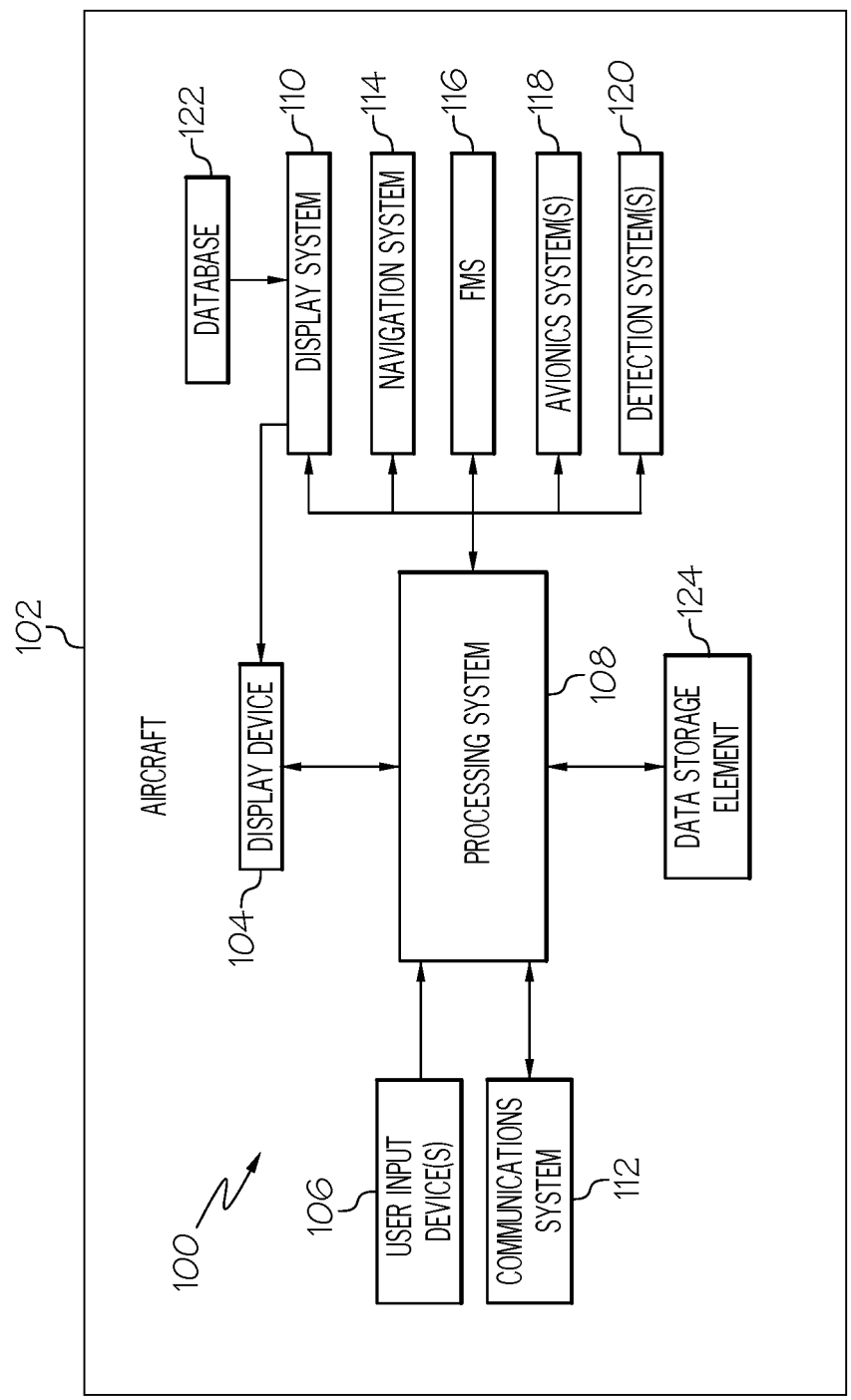
FIG. 1 is a block diagram of a system for an aircraft in an exemplary embodiment.

Embodiments of the subject matter described herein generally relate to systems and methods for facilitating a safe diversion of a vehicle to an originally unintended destination. In this regard, due to the unplanned nature of diverting from an original travel plan, some remedial action may be required to comply with requirements for accessing the diversion destination. At the same time, it can be difficult for a vehicle operator to concurrently manage and implement remedial action(s) with respect to one or more vehicle characteristics while concurrently operating the vehicle and maintaining adequate situational awareness. For example, in an emergency situation, a pilot diverting an aircraft carrying an amount of fuel necessary for reaching the original intended destination may need to reduce the amount of fuel onboard the aircraft to satisfy maximum landing weight(s) or other safety criteria while concurrently operating the aircraft and monitoring meteorological conditions, aircraft component configurations, and the like. Accordingly, embodiments described herein construct a diversion route or path to the diversion destination from the current vehicle position based at least in part on a current value for a vehicle characteristic and the other applicable criteria and constraints so that a predicted value for the vehicle at the diversion destination satisfies applicable safety criteria. While the subject matter is primarily described herein in the context of presenting a diversion route to a diversion airport for an aircraft deviating from a flight plan, the subject matter described herein may be similarly utilized in other applications or in the context of other types of vehicles (e.g., automobiles, marine vessels, trains, or the like). That said, for purposes of explanation, but without limitation, the subject matter is described herein in the context of presenting information pertaining to aircraft operations.

As described in greater detail below, a diversion route is constructed that emanates, originates, or otherwise starts from the current aircraft position and terminates or otherwise ends at the diversion airport. In exemplary embodiments, the diversion route accounts for current and/or forecasted meteorological conditions along the route, the current and/or predicted aircraft configuration while en route, and/or other factors influencing fuel consumption and flight time while satisfying applicable safety criteria for landing the aircraft at the diversion airport, such as, for example, a maximum landing weight associated with the type of aircraft. That said, other safety criteria may also be accounted for under different operating conditions. For example, in the event of a loss of cabin pressure, the safety criteria may include a maximum aircraft altitude (e.g., to mitigate or prevent hypoxia). The safety criteria may also include time constraints, for example, a minimum flight time (or minimum estimated arrival time) to prevent arriving at the diversion airport too quickly and having to hold or otherwise navigate in the vicinity of air traffic within the terminal control area.

The diversion route is constructed so that predicted values for the fuel remaining, aircraft weight, and/or other characteristics of the aircraft satisfy the applicable threshold values for the respective safety criteria associated with landing at the diversion destination. At the same time, the diversion route construction may attempt to minimize the flight time and achieve as close to a direct route as possible while accounting for meteorological conditions, aircraft configuration, and the like. In this regard, in some embodiments, meteorological conditions or aircraft configuration status may be leveraged in conjunction with the route generation to increase the fuel burn rate and the like so that predicted value(s) of aircraft characteristic(s) satisfy the applicable safety thresholds without traveling too indirectly or too far from the diversion airport.

In exemplary embodiments, the diversion route is displayed or otherwise presented to the pilot to facilitate operation of the aircraft traversing towards the diversion airport in a manner that accounts for the applicable safety criteria for landing at the diversion airport. Additionally, in some embodiments, the diversion route may be automatically inserted into the flight plan in lieu of the originally planned route from the current aircraft position to the intended destination to support automatically traveling the diversion route (e.g., using autopilot). In one or more exemplary embodiments, the diversion route is dynamically updated to reflect changes in meteorological conditions, fuel remaining, aircraft position, and potentially other dynamic factors effecting the ability of the aircraft to comply with safety criteria for the diversion destination. Thus, as the actual (or real-time) fuel consumption, meteorological conditions, or aircraft configuration status deviate from what was originally predicted upon initial generation of the diversion route, the diversion route may be updated to reflect real-time conditions to ensure applicable safety constraints will still likely be satisfied by the aircraft at the end of the diversion route.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102, as described in greater detail below in the context of FIG. 9. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
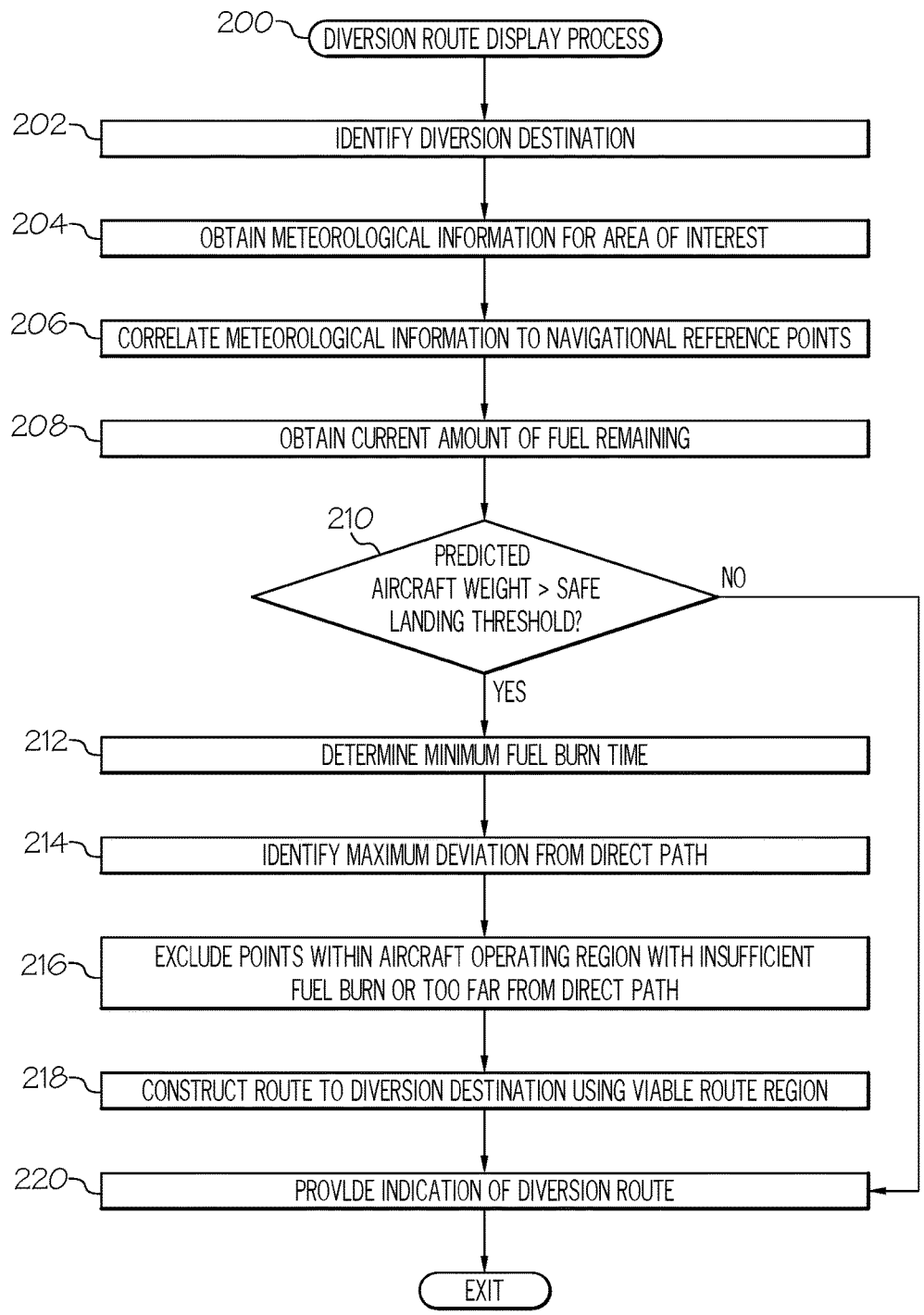
FIG. 2 is a flow diagram of an exemplary diversion route display process suitable for use with the aircraft in the system of FIG. 1 in accordance with one or more embodiments.

Referring now to FIG. 2, in an exemplary embodiment, the system 100 is configured to support a diversion route display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the diversion route display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the diversion route display process 200 may include any number of additional or alternative tasks, the tasks need not be performed in the illustrated order and/or the tasks may be performed concurrently, and/or the diversion route display process 200 may be incorporated into a more comprehensive procedure or process having additional functionality not described in detail herein. Moreover, one or more of the tasks shown and described in the context of FIG. 2 could be omitted from a practical embodiment of the diversion route display process 200 as long as the intended overall functionality remains intact.

Still referring to FIG. 2, and with continued reference to FIG. 1, in an exemplary embodiment, the diversion route display process 200 begins by identifying or otherwise determining a diversion destination for the aircraft (task 202). In some embodiments, the processing system 108 receives indication of the desired diversion destination from a user via the user input device 106. In other embodiments, the processing system 108 may automatically select or otherwise identify the diversion destination from among a plurality of potential diversion destinations based on one or more factors, such as, for example, the current position of the aircraft 102 relative to the respective diversion destinations, the current fuel remaining onboard the aircraft 102 (or the current aircraft range), current meteorological conditions at the respective diversion destinations, current runway status at the respective diversion destinations, and the like. In this regard, the processing system 108 may automatically select a diversion airport that is likely to be most viable based on the current situation. For example, the processing system 108 may automatically select a diversion airport that is likely to be most viable based on the current aircraft weight, the relationship of the current aircraft weight (and the characteristics influencing the aircraft weight) with respect to the distances between the potential diversion airports, and the like. Thus, the processing system 108 may automatically select a diversion airport in a manner that accounts for maximum landing weight criteria, so that the resulting diversion destination airport is one for which the aircraft 102 is most likely to be able to land at while satisfying the applicable maximum landing weight constraint(s).

The diversion route display process 200 continues by obtaining meteorological information for an aircraft operating region of interest (task 204). In this regard, the aircraft operating region of interest corresponds to a geographical area encompassing the current location of the aircraft 102 obtained via the navigation system 114 and the diversion destination. The processing system 108 obtains current or real-time meteorological information for points within the aircraft operating region from one or more of the onboard detection system(s) 120 and/or any external weather monitoring system(s) via the communications system 112. Additionally, the processing system 108 may obtain forecasted meteorological information for points within the aircraft operating region from one or more of the onboard detection system(s) 120 and/or any external weather monitoring system(s) for forecast time periods between the current time and the estimated time when the planned destination airport is expected to be available. It should be noted that the obtained meteorological information may be three-dimensional within the lateral geographic area encompassing the diversion destination and the current aircraft location to account for potential changes in the flight level or altitude of the aircraft 102 during execution of the diversion route.

In exemplary embodiments, the diversion route display process 200 continues by correlating or otherwise translating the meteorological information to navigational reference points within that region (task 206). That is, the meteorological data points are essentially translated from a meteorological weather grid domain to a navigational reference point domain that can be utilized for navigating the aircraft 102. In this regard, the processing system 108 correlates or otherwise translates the meteorological information for points within the aircraft operating region to nearby navigational reference points within the aircraft operating region (e.g., waypoints, airways, and/or other navigational aids). In this regard, meteorological information corresponding to different locations within the aircraft operating region may be integrated, fused, extrapolated, interpolated, or otherwise combined to achieve likely meteorological information at or near the location associated with a particular navigational reference point that may be utilized for navigating the aircraft 102. Moreover, in some embodiments the meteorological information corresponding to different locations within the aircraft operating region may be integrated, fused, extrapolated, interpolated, or otherwise combined to achieve likely meteorological information for points along airways or points that otherwise intervene between navigational reference points or between the aircraft 102 and respective navigational reference points.

Still referring to FIG. 2, the illustrated process 200 identifies or otherwise obtains the current amount of fuel remaining onboard the aircraft and calculates or otherwise determines whether the predicted landing weight of the aircraft at the diversion airport is greater than the maximum landing weight (tasks 208, 210). In this regard, the processing system 108 obtains, via the FMS 116 or another avionics system 118, the current amount of fuel remaining onboard the aircraft 102. The processing system 108 obtains, via the navigation system 114, the current aircraft position and then calculates or otherwise determines an estimated fuel consumption for traveling a direct route to the diversion destination from the current aircraft position based on the current and/or forecasted meteorological information between the current aircraft position and the diversion airport (e.g., the meteorological information correlated to the navigational reference points that define the direct route). The processing system 108 subtracts the estimated fuel consumption from the current amount of fuel onboard to obtain a predicted amount of fuel remaining at the diversion airport, and then calculates or otherwise determines a predicted landing weight of the aircraft 102 at the diversion airport based on the predicted amount of fuel onboard. When the predicted landing weight of the aircraft at the diversion airport is less than the maximum landing weight, the diversion route display process 200 provides indication of the direct route to the diversion airport as the diversion route (task 220), as described in greater detail below.

When the predicted landing weight of the aircraft at the diversion airport is greater than the maximum landing weight, the diversion route display process 200 constructs a diversion route configured to increase the fuel consumption and thereby reduce the predicted landing weight to a value that is less than the maximum landing weight. In the illustrated embodiment, the diversion route display process 200 calculates or otherwise determines a minimum amount of flight time required to burn sufficient fuel to provide a predicted landing weight less than or equal to the a maximum landing weight (task 212). In this regard, the processing system 108 determines the difference between the current fuel remaining onboard the aircraft 102 and the amount of fuel onboard corresponding to the maximum landing weight (e.g., an amount of excess fuel for landing at the diversion airport), and then calculates or otherwise determines the amount of flight time for the aircraft 102 required to burn that amount of fuel. In determining the minimum fuel burn time, the processing system 108 may also account for meteorological conditions and aircraft configurations that may influence the fuel burn rate. For example, the processing system 108 may assume a fuel inefficient aircraft configuration and determine the minimum fuel burn time based on that aircraft configuration and the current and/or forecasted meteorological condition between the current aircraft position and the diversion airport. In this regard, the minimum fuel burn time may represent the theoretical minimum amount of time required for the aircraft 102 to consume the excess fuel given the current meteorological conditions, the current vertical distance between the current aircraft altitude and the diversion altitude, and the like.

In exemplary embodiments, the diversion route display process 200 also identifies or otherwise obtains one or more route construction criteria that generally define the extents that the diversion route is allowed to deviate from a direct path to the diversion destination (task 214). For example, the processing system 108 may identify one or more of a maximum allowable distance from the direct path and/or, a maximum allowable flight time from the direct path and/or the diversion destination, a minimum fuel requirement (e.g., a minimum amount of fuel onboard the aircraft for executing the final approach), and/or other safety constraints that limit the construction of the diversion route. It should be noted that the subject matter described herein is not limited to any particular type or combination of safety criteria that constrain the route construction, and in practice, there are numerous different potential safety criteria. As such, practical embodiments may include additional or fewer safety criteria, and in various potential combinations to achieve the objectives of a particular embodiment. The processing system 108 may receive or otherwise obtain the values for the route construction criteria from a pilot or other user via the user input device 106 and store or otherwise maintain the values in the data storage element 124 for subsequent reference.

Still referring to FIG. 2, the diversion route display process 200 generates a viable route region of navigational reference points for constructing the diversion route by excluding or otherwise eliminating navigational reference points that do not satisfy either the minimum fuel burn time or the maximum deviation from the direct path (task 216). In this regard, the viable route region comprises a subset of navigational reference points within the aircraft operating region from which a diversion route from the current aircraft position to the diversion airport may be constructed. For each point within the aircraft operating region, the processing system 108 may calculate or otherwise determine whether the aircraft 102 can traverse that respective point en route to the diversion airport without arriving at the diversion airport before the minimum fuel burn time has elapsed. The processing system 108 excludes or otherwise eliminates from further consideration those navigational reference points that do not allow for the excess fuel to be consumed en route to the diversion airport without additional looping or other traversing away from the diversion airport. Additionally, the processing system 108 excludes or otherwise eliminates from further consideration those navigational reference points having a distance from the direct path to the diversion airport (or alternatively, a distance from the diversion airport) that exceeds a maximum allowable deviation distance. In some embodiments, the processing system 108 excludes or otherwise eliminates from further consideration those navigational reference points that the aircraft 102 either cannot traverse en route to the diversion airport without exceeding a maximum allowable flight time, or those that the aircraft 102 cannot traverse without violating minimum fuel requirements upon arrival at the diversion airport. Again, the subject matter described herein is not limited to any particular type or combination of criteria that constrain the navigational reference points utilized for the route construction.

After identifying the navigational reference points within the viable route region, the diversion route display process 200 constructs a route to the diversion destination using the viable route region (task 218). In exemplary embodiments, the processing system 108 attempts to identify, from among the potential sequences of navigational reference points within the viable route region that provide a path from the current aircraft position to the diversion airport, the sequence of navigational references points having a minimum flight time while also achieving sufficient fuel burn and satisfying other applicable safety criteria. In accordance with one or more embodiments, the processing system 108 creates a graph data structure representative of the subset of potential navigational reference points within the viable route region, where the navigational reference points provide the nodes of the graph and the edges between respective pairs of nodes are associated with the estimated flight time and fuel consumption corresponding to that respective flight path between navigational reference points. In such embodiments, for sequences having substantially the same estimated flight time (or arrival time), the processing system 108 may select or otherwise identify the sequence with the highest estimated fuel consumption as the optimal route sequence. As described in greater detail in the context of FIGS. 3-9, in other embodiments, the diversion route display process 200 iteratively analyzes potential route sequences until identifying a sequence of navigational reference points satisfying the landing weight (or fuel consumption) threshold. In this regard, in some situations, a comprehensive analysis of all potential sequences of navigational reference points within the viable route region to identify an optimal may not be computationally feasible within a desired amount of time (e.g., due to the number of potential route combinations, hardware limitations, or the like).

After identifying a route that achieves sufficient fuel consumption and satisfies other applicable route criteria, the diversion route display process 200 generates or otherwise provides indication of the diversion route (task 220). In exemplary embodiments, the processing system 108 displays a graphical representation of the route (or at least a portion thereof) on a navigational map having a corresponding geographic area that encompasses the current aircraft position. Additionally, in some embodiments, the processing system 108 automatically updates a flight plan maintained by the FMS 116 to incorporate the route, for example, by inserting the sequence of navigational reference points (and corresponding altitudes or flight levels) of the route into the flight plan in lieu of the original (or previous) sequence of navigational reference points defining the originally planned flight path from the current aircraft position to the intended destination. In situations where the diversion route requires modifications to the aircraft configuration to achieve sufficient fuel burn, the processing system 108 may also generate or otherwise provide indication of those changes to the aircraft configuration at corresponding locations along the diversion route. For example, symbology indicating a particular aircraft configuration may be presented proximate a navigational reference point on the map, or an auditory alert may be generated when the aircraft 102 traverses a particular navigational reference point of the diversion route.

In one or more exemplary embodiments, the diversion route display process 200 dynamically updates the route in real-time in response to changes in the fuel consumption of the aircraft or changes to the meteorological conditions. In this regard, as the aircraft travels and/or updated meteorological information becomes available, the diversion route display process 200 may repeat to modify the diversion route to ensure the safe landing weight and other criteria are satisfied. For example, if the fuel consumption over an initial portion of the diversion route is greater than anticipated (e.g., stronger headwinds than anticipated) so that the current amount of fuel remaining onboard allows for a direct route to the diversion airport from the updated aircraft position to achieve the maximum landing weight, the diversion route display process 200 may update the navigational map to indicate a direct route to the diversion airport may now be flown. Conversely, if the current amount of fuel remaining onboard indicates fuel consumption over an initial portion of the diversion route was less than anticipated or meteorological conditions indicate fuel consumption over a subsequent portion of the diversion route indicate future fuel consumption may be is less than originally anticipated (e.g., increased tailwinds), the diversion route display process 200 may determine an updated diversion route (e.g., tasks 212, 214, 216, 218) and update the navigational map to indicate the updated diversion route to the diversion airport in lieu of the previously presented diversion route.

Figure 3:
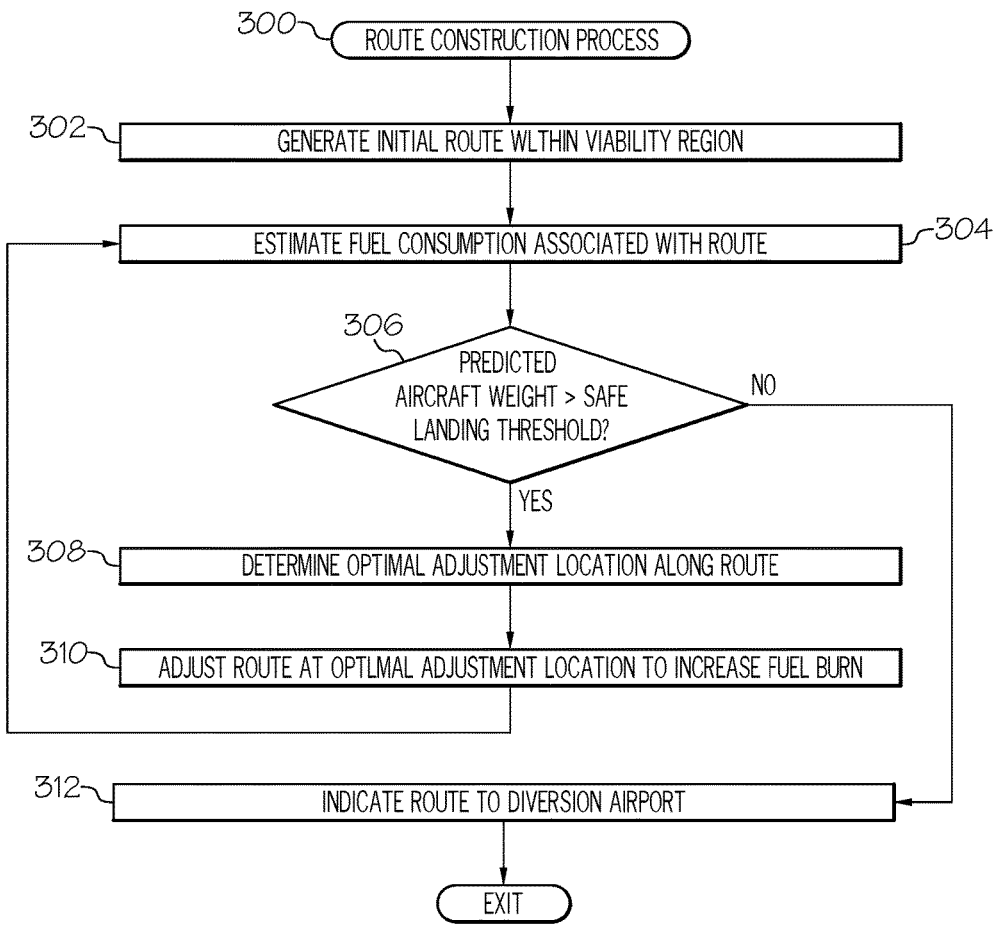
FIG. 3 is a flow diagram of an exemplary route construction process suitable for use with the diversion route display process of FIG. 2 in accordance with one or more embodiments.

Referring now to FIG. 3, in one exemplary embodiment, the system 100 is configured to support a route construction process 300 in conjunction with the diversion route display process 200 of FIG. 2 (e.g., task 218) and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the route construction process 300 may be performed by different elements of the system 100; however, for purposes of explanation, the route construction process 300 may be described herein primarily in the context of being performed by the processing system 108. Again, it should be appreciated that the route construction process 300 may include any number of additional or alternative tasks, may not be performed in the illustrated order, one or more of the tasks may be performed concurrently or omitted, and/or the route construction process 300 may be incorporated into a more comprehensive procedure or process having additional functionality not described in detail herein.

The route construction process 300 iteratively adjusts navigational reference points defining a potential route from the current aircraft position to the diversion airport until identifying a sequence of navigational reference points that satisfies applicable criteria for landing at the diversion airport. In exemplary embodiments, the route construction process 300 identifies or otherwise generates an initial route within the viable route region, calculates or otherwise determines an estimated fuel consumption associated with traversing the initial route, and determines whether the predicted landing weight based on the estimated fuel consumption is greater than the maximum safe landing weight (tasks 302, 304, 306). In one embodiment, the processing system 108 determines an initial diversion route for analysis as the sequence of navigational reference points that are adjacent or otherwise closest to an exclusion zone defined by the navigational reference points with insufficient fuel burn. In another embodiment, the processing system 108 determines the initial diversion route as the sequence of navigational reference points corresponding to the geometric mean path between the exclusion zone defined by the excluded navigational reference points with insufficient fuel burn (e.g., task 214) and the exclusion zone defined by the excluded navigational reference points having a distance or flight time difference from the direct path that exceeds the applicable route construction criteria (e.g., task 216). Based on the current and/or forecasted meteorological conditions for the navigational reference points along the initial route, the processing system 108 calculates or otherwise determines the estimated fuel consumption for the aircraft 102 traversing that route. The processing system 108 subtracts the estimated fuel consumption from the current amount of fuel remaining onboard to obtain a predicted amount of fuel remaining at the diversion airport, which, in turn is utilized to calculate a predicted landing weight (e.g., based on a sum of the aircraft weight, cargo weight, and the weight of the predicted amount of fuel remaining).

When the predicted landing weight at the diversion airport is greater than the maximum landing weight, the route construction process 300 identifies or otherwise determines a navigational reference point along the route to be adjusted and modifies or otherwise alters the route to deviate from that navigational reference point in a fuel inefficient manner (tasks 308, 310). In this regard, the processing system 108 identifies which navigational reference point of the route can be substituted with another navigational reference point to achieve the greatest increase in the estimated fuel consumption. In some embodiments, the processing system 108 identifies an optimal adjustment as a weighted sum of the potential increase in the estimated fuel consumption associated with substituting the new reference point and the potential decrease in the estimated flight time associated with substituting the new reference point. In such embodiments, the route construction process 300 iteratively adjusts the route to increase fuel consumption and decrease the estimated flight time in an optimal manner according to the weighting factors assigned to those respective characteristics.

After adjusting a navigational reference point of the route, the route construction process 300 repeats the steps of determining an estimated fuel consumption associated with updated route (tasks 304, 306). When the predicted landing weight at the diversion airport is greater than the maximum landing weight, the route construction process 300 repeats the steps identifying another navigational reference point along the updated route to be adjusted and further modifying the updated route to deviate from that navigational reference point in a fuel inefficient manner (tasks 308, 310). In this regard, the processing system 108 iteratively adjusts navigational reference points along the potential diversion route sequences until the predicted landing weight at the diversion airport is less than or equal to the maximum landing weight. Once the route construction process 300 identifies a sequence of navigational reference points that achieves a predicted landing weight that is less than the maximum safe landing weight, the route construction process 300 generates or otherwise provides indication of that sequence of navigational reference points as the diversion route to be executed by the aircraft (task 312), for example, by displaying a graphical representation of the diversion route on a navigational map on the display device 104 or loading the navigational reference points of the diversion route into the flight plan of the FMS 116.

In one or more embodiments, the route construction process 300 allows for the adjustment of a navigational reference point into the insufficient fuel burn exclusion zone when the adjustment is configured to increase the fuel consumption relative to the route within the viable route region. In embodiments where the route construction process 300 is unable to arrive at a route that achieves sufficient fuel burn without violating other route construction criteria, the route construction process 300 may begin altering the aircraft configuration, flight level, or other aspects influencing fuel consumption along the route to increase the fuel burn. For example, the route construction process 300 may initially assign a fuel inefficient aircraft configuration (e.g., landing gear deployed) for the route segment at the end of the diversion route (e.g., the final route segment between the final navigational reference point of the route and the diversion airport), and then iteratively assign the fuel inefficient aircraft configuration to preceding route segments (e.g., the next-to-last route segment between the final navigational reference point and the preceding navigational reference point) until the predicted landing weight is less than or equal to the maximum safe landing weight. In such embodiments, the processing system 108 generates or otherwise provides indication of the fuel inefficient aircraft configuration at the corresponding locations along the diversion route, for example, by rendering the route segments and/or navigational reference points associated with the fuel inefficient configuration using one or more visually distinguishable characteristics, or alternatively, by displaying symbology indicative of the fuel inefficient aircraft configuration in graphical association with the route segments and/or navigational reference points.

Figure 4:
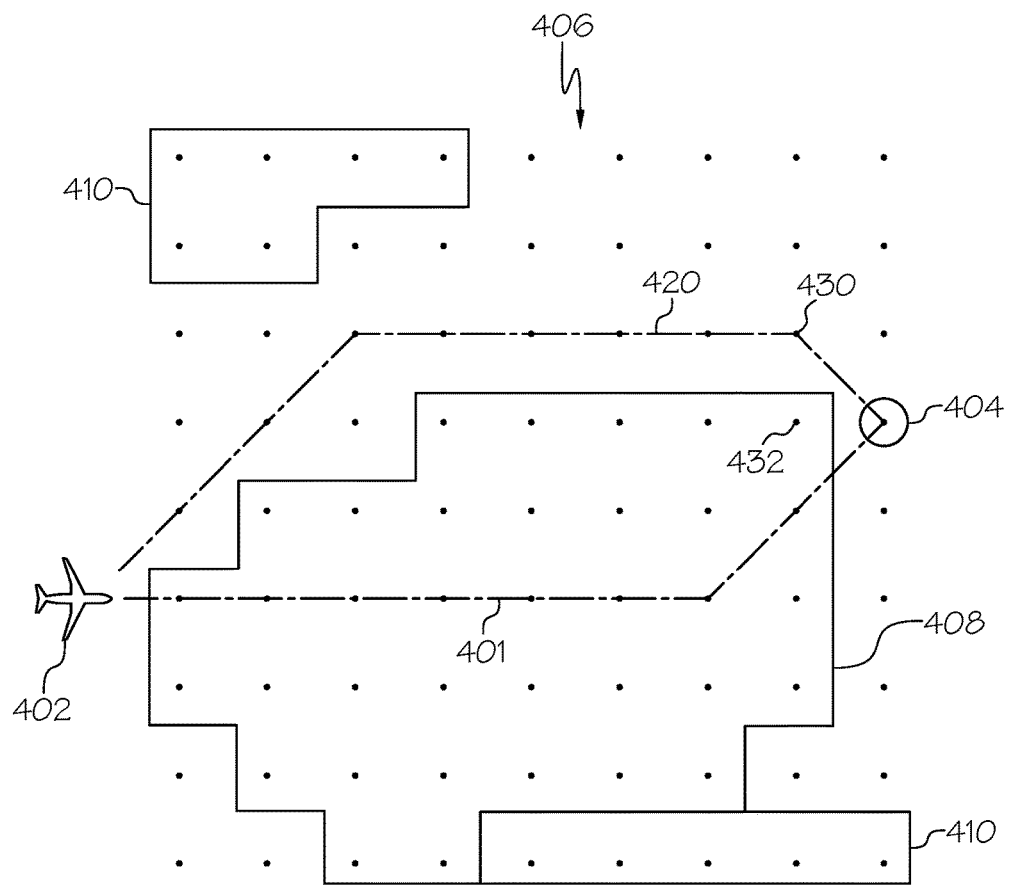
FIGS. 4-5 depict an exemplary embodiment of a diversion route constructed between a current aircraft position and a diversion airport in conjunction with the diversion route display process of FIG. 2 and the route construction process of FIG. 3 in accordance with one or more embodiments.
Figure 5:
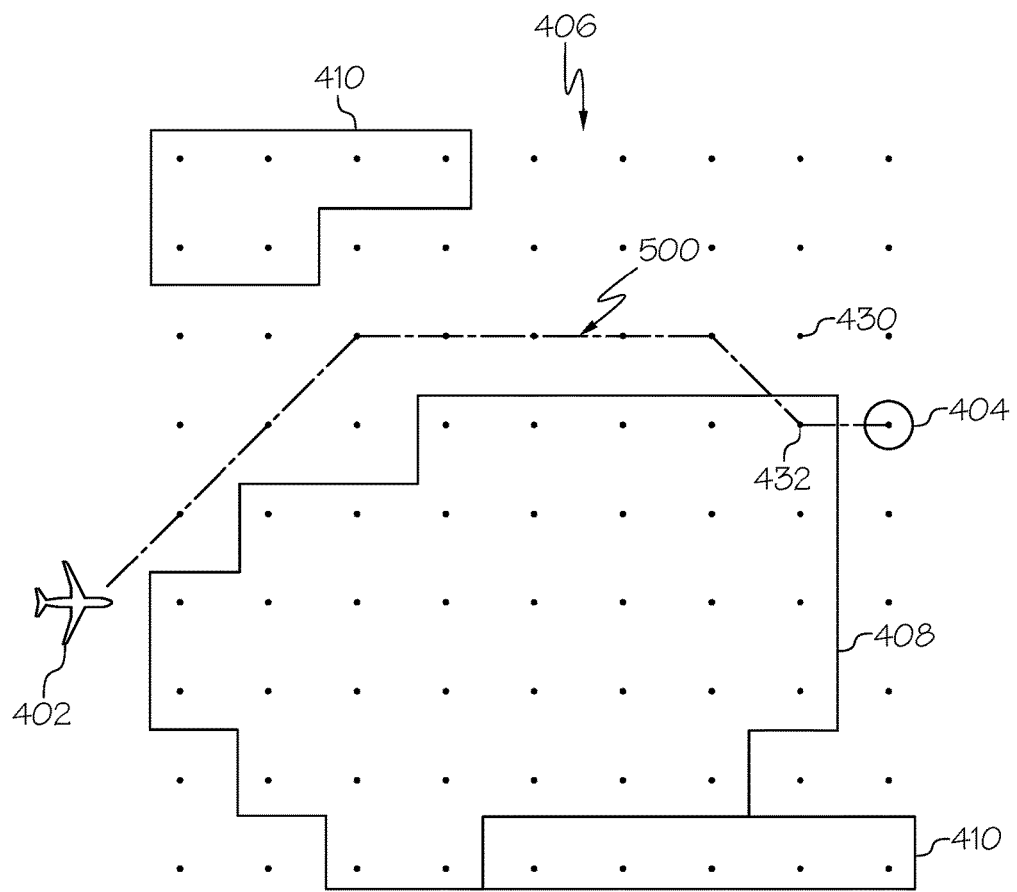

FIGS. 4-5 depict an exemplary embodiment of a diversion route 500 that may be constructed by the processing system 108 in conjunction with the route construction process 300. As described above, from within the region encompassing diversion destination 404 and the current aircraft position 402, the processing system 108 identifies a subset of navigational reference points within a viable route region 406 by excluding or otherwise eliminating navigational reference points having insufficient fuel burn (indicated by exclusion region 408) and navigational reference points that are too far (either in terms of flight time or distance) from either the diversion airport 404 or a direct route 401 to the diversion airport 404 (indicated by exclusion region 410). For each potential pair of navigational reference points within the viable route region 406, the processing system 108 determines estimated travel times and fuel consumption associated with direct paths between the respective pairs of navigational reference points within the region viable route region 406 based on the current and/or forecasted meteorological information for the region 408 and constructs a graph structure representative of the potential route segments within the region 406.

In the embodiment of FIG. 4, the processing system 108 identifies an initial diversion route 420 for analysis as the sequence of navigational reference points that are adjacent or otherwise closest to the exclusion zone 408 defined by the navigational reference points with insufficient fuel burn, for example, by using the graph data structure to identify a path having a shortest flight time. Referring now to FIG. 5 with reference to FIG. 4, when the predicted landing weight at the diversion airport 404 at the end of the initial route 420 is greater than the maximum landing weight, the processing system 108 identifies a navigational reference point 430 of the route that can be adjusted by substituting with another navigational reference point 432 to achieve the greatest relative increase in estimated fuel consumption. In this regard, as described above, some embodiments of the route construction process 300 allow for selection of points within the insufficient fuel burn zone 408 when the selection results in an increase in the fuel consumption associated with the proposed route.

After adjusting the route to traverse navigational reference point 432 in lieu of navigational reference point 430, the processing system 108 determines an estimated fuel consumption associated with updated route 500. When the predicted landing weight at the diversion airport 404 for the updated route 500 is less than or equal to the maximum landing weight, the processing system 108 generates or otherwise provides indication of the updated route 500 as the diversion route to be utilized by the aircraft 102 for reaching the diversion airport 404 with a safe landing weight. It should be noted that although FIGS. 4-5 depict route adjustments in two dimensions within the same flight level, in practice, the route adjustments may be performed in three dimensions, for example, by adjusting the flight level at or between various navigational reference points based on meteorological conditions at different flight levels that increases fuel consumption. In such embodiments, once the potential three-dimensional adjustments to the route have effectively been exhausted, the route construction process 300 may begin iteratively adjusting the aircraft configuration for segments of the route proximate the diversion airport until arriving at a sequence of navigational reference points and corresponding aircraft configuration(s) that result in the necessary fuel consumption for landing safely at the diversion airport.

Figure 6:
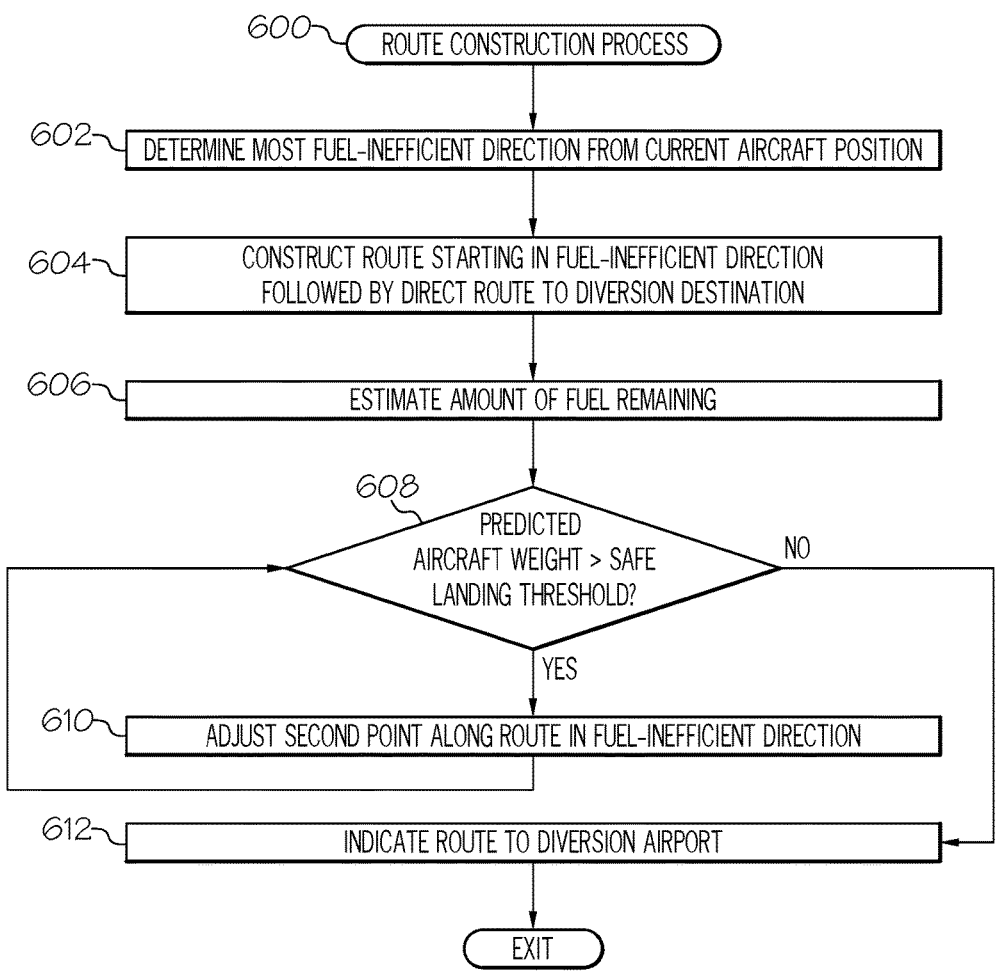
FIG. 6 is a flow diagram of another exemplary route construction process suitable for use with the diversion route display process of FIG. 2 in accordance with one or more embodiments.

Referring now to FIG. 6, in another exemplary embodiment, the system 100 is configured to support a different route construction process 600 in conjunction with the diversion route display process 200 of FIG. 2 (e.g., task 218) and perform additional tasks, functions, and operations described below. The various tasks performed in connection with the illustrated process 600 may be implemented using hardware, firmware, software executed by processing circuitry, or any combination thereof. For illustrative purposes, the following description may refer to elements mentioned above in connection with FIG. 1. In practice, portions of the route construction process 600 may be performed by different elements of the system 100; however, for purposes of explanation, the route construction process 600 may be described herein primarily in the context of being performed by the processing system 108. Again, it should be appreciated that the route construction process 600 may include any number of additional or alternative tasks, may not be performed in the illustrated order, one or more of the tasks may be performed concurrently or omitted, and/or the route construction process 600 may be incorporated into a more comprehensive procedure or process having additional functionality not described in detail herein.

The route construction process 600 of FIG. 6 begins by identifying or otherwise determining a navigational reference point within the viable route region that is in the most fuel-inefficient direction from the current aircraft position (task 602). In this regard, using the graph data structure, the processing system 108 identifies or otherwise determines which navigational reference point within the viable route region achieves the highest rate of fuel consumption from the current aircraft position, and then utilizes that navigational reference point to define the initial route segment of the diversion route. For example, the processing system 108 may determine, for each navigational reference point within the viable route region, a ratio of the estimated fuel consumption associated with the route segment from the current aircraft position to that navigational reference point divided by the estimated flight time associated with the route segment. In some embodiments, the processing system 108 identifies the navigational reference point having the highest value for the ratio as the initial navigational reference point of the diversion route. In other embodiments, the processing system 108 filters or otherwise excludes from consideration as an initial navigational reference point those navigational reference points that are not within a threshold distance or flight time of the current aircraft position, so that the identified initial navigational reference point is proximate the current aircraft position. As an example, the processing system 108 may determine an estimated distance or flight time associated with a direct path to the diversion airport from the current aircraft position, and then determine the threshold distance or flight time for excluding navigational reference points as a fraction of the estimated direct distance or flight time. For example, navigational reference points having a distance relative to the current aircraft position that is greater than 25% of the estimated direct distance or flight time to the diversion airport.

After determining an initial navigational reference point for a potential diversion route, the route construction process 300 generates or otherwise constructs the remainder of the potential diversion route by assuming a direct route from that initial navigational reference point to the diversion airport and then determines whether the estimated fuel consumption associated with the resulting route is sufficient to result in the predicted aircraft landing weight satisfying the maximum landing weight threshold (tasks 604, 606, 608). In this regard, the route construction process 300 attempts to minimize flight time while also complying with the maximum landing weight threshold by taking a direct route after initially traversing in a fuel inefficient manner to expedite fuel consumption. In exemplary embodiments, the direct route is allowed to traverse exclusion zones (e.g., the minimum fuel burn region) and include navigational reference points that were otherwise excluded from consideration for the initial navigational reference point. Based on the current and/or forecasted meteorological conditions for the navigational reference points along the route, the processing system 108 calculates or otherwise determines the estimated fuel consumption for traversing the route and then subtracts the estimated fuel consumption from the current amount of fuel remaining onboard to obtain a predicted amount of fuel remaining at the diversion airport, which, in turn is utilized to calculate a predicted landing weight.

When the predicted landing weight at the diversion airport is greater than the maximum landing weight, the route construction process 300 identifies or otherwise determines another navigational reference point along the route to be adjusted in a fuel-inefficient manner and modifies or otherwise adjusts the route to deviate from that navigational reference point in a fuel inefficient manner (task 610). In exemplary embodiments, the route construction process 300 identifies or otherwise determines the navigational reference point that is in the most fuel inefficient direction from the initial navigational reference point in the fuel inefficient direction (e.g., task 602). Again, using the graph data structure, the processing system 108 identifies or otherwise determines which navigational reference point within the viable route region achieves the highest rate of fuel consumption from the from the initial navigational reference point, and then utilizes that navigational reference point to define another segment of the diversion route. Thereafter, the route construction process 300 generates or otherwise constructs the remainder of the potential diversion route by assuming a direct route from that newly identified navigational reference point to the diversion airport and then determines whether the estimated fuel consumption associated with the resulting route is sufficient to result in the predicted aircraft landing weight satisfying the maximum landing weight threshold (tasks 604, 606, 608).

When the predicted landing weight at the diversion airport is still greater than the maximum landing weight, the route construction process 600 iteratively updates the route by adjusting navigational reference points to define the initial flight path in a more fuel-inefficient manner prior to traversing a direct route to the diversion airport until the predicted landing weight at the end of the route is less than or equal to the maximum safe landing weight threshold (tasks 604, 606, 608, 610). In a similar manner as described above, once the route construction process 600 identifies a sequence of navigational reference points that achieves a predicted landing weight that is less than the maximum safe landing weight, the route construction process 600 generates or otherwise provides indication of that sequence of navigational reference points as the diversion route to be executed by the aircraft (task 612), for example, by displaying a graphical representation of the diversion route on a navigational map on the display device 104 or loading the navigational reference points of the diversion route into the flight plan of the FMS 116.

Figure 7:
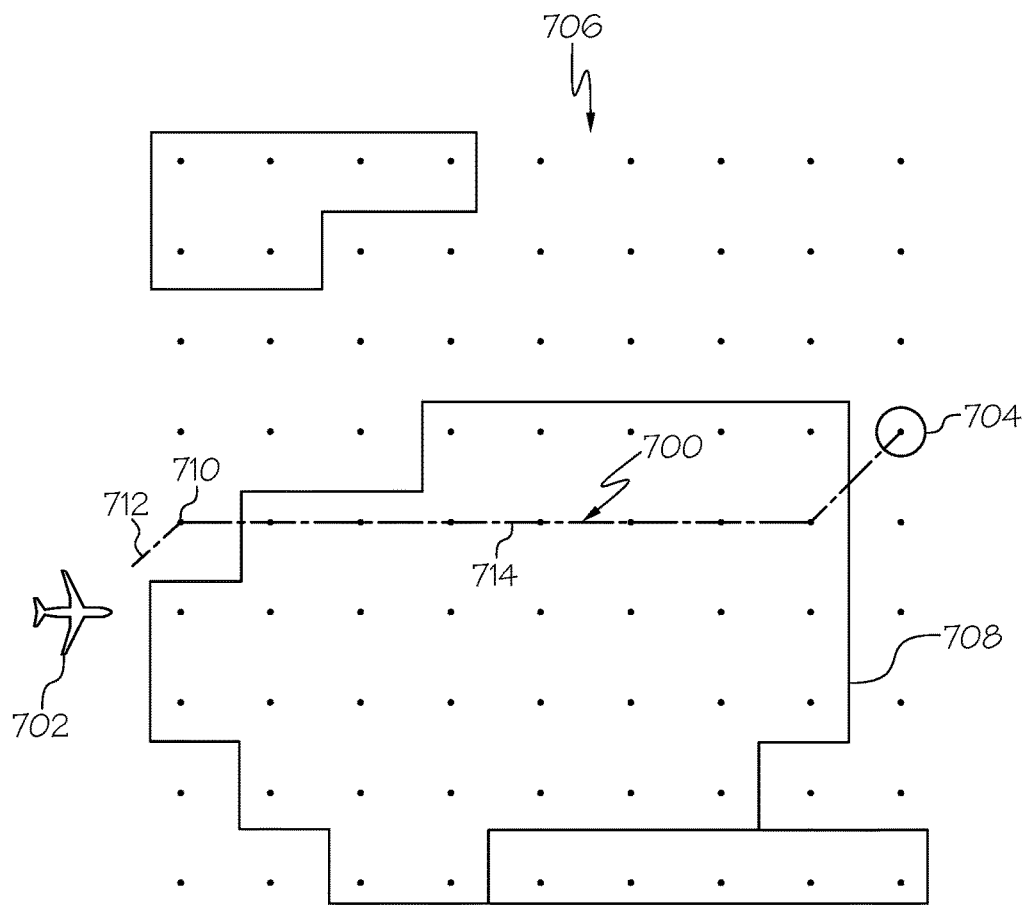
FIGS. 7-9 depict an exemplary embodiment of a diversion route constructed between a current aircraft position and a diversion airport in conjunction with the diversion route display process of FIG. 2 and the route construction process of FIG. 6 in accordance with one or more embodiments.
Figure 8:
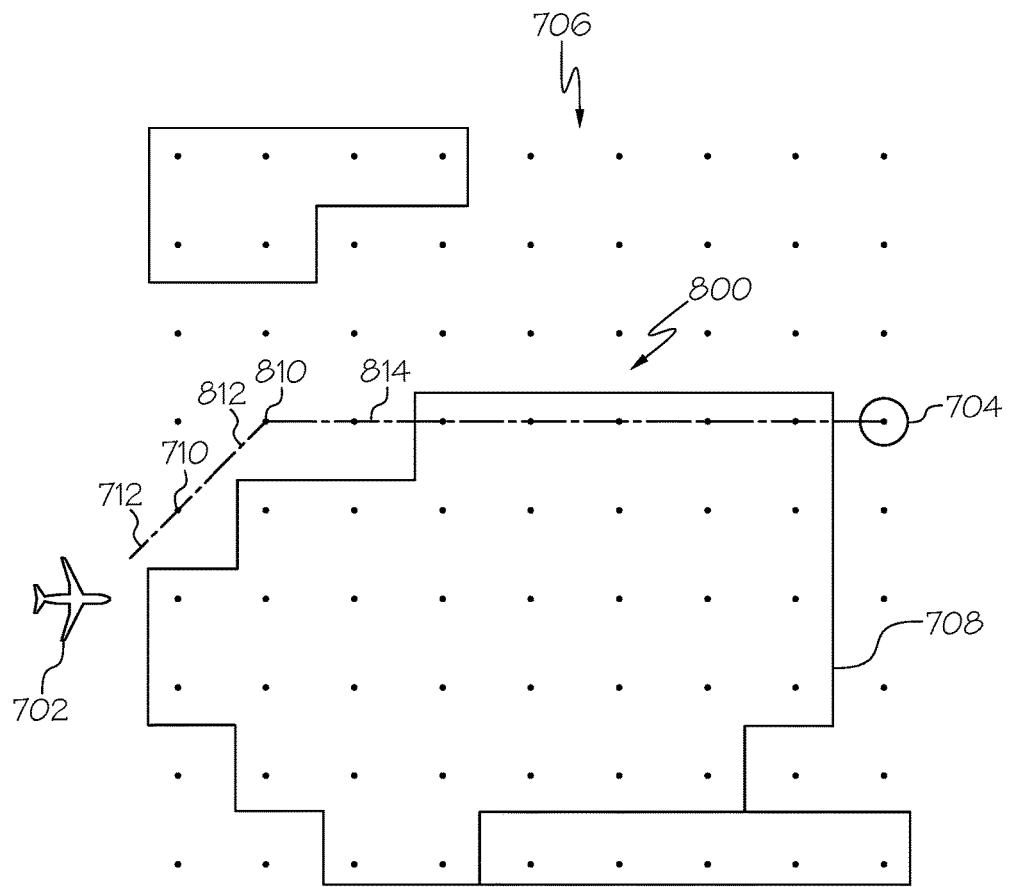
Figure 9:
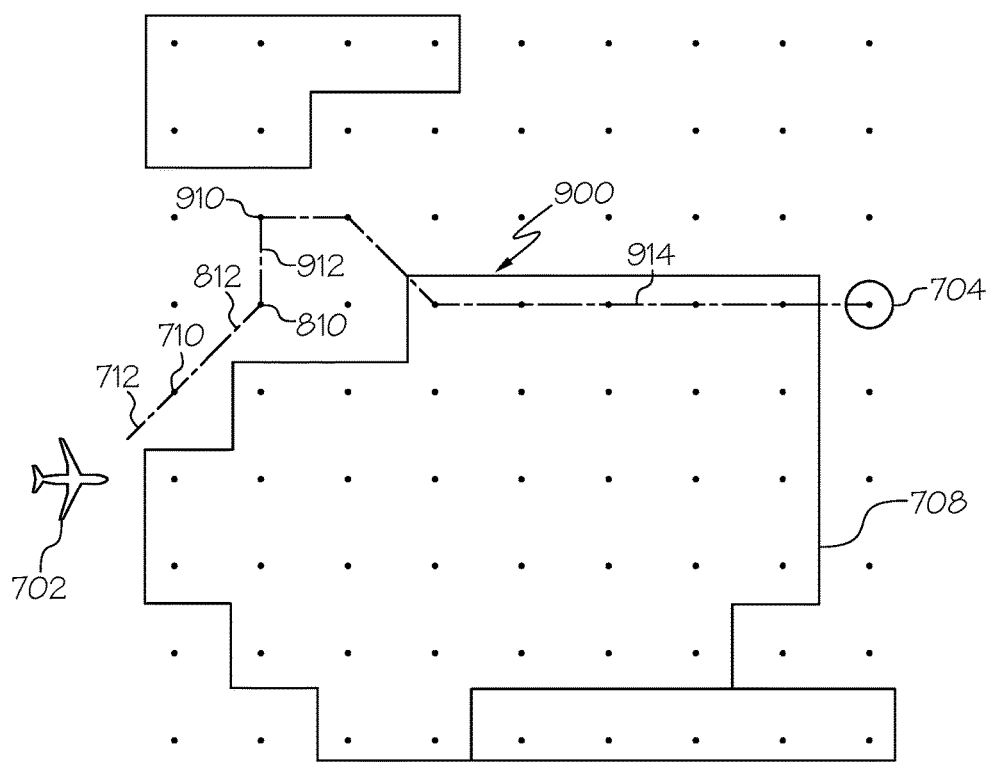

FIGS. 7-9 depict an exemplary embodiment of the route construction process 600 of FIG. 6. From the current aircraft position 702, the processing system 108 identifies an initial navigational reference point 710 within a viable route region 706 that provides the most inefficient fuel consumption from the current aircraft position 702 (e.g., task 602). Thereafter, the processing system 108 constructs a direct route 714 from that point 710 to the diversion airport 704, resulting in potential diversion route 700 (e.g., task 604). As illustrated, the potential diversion route 700 traverses navigational reference points within the insufficient fuel burn zone 708 for the sake of minimizing flight time en route to the diversion airport 704 in the event that the estimated fuel consumption associated with the initial inefficient route segment 712 is sufficient to result in a predicted landing weight at the end of the route 700 being less than the maximum safe landing threshold.

Turning to FIG. 8, when the predicted landing weight at the end of the route 700 is greater than the maximum safe landing threshold, the processing system 108 identifies another navigational reference point 810 within a viable route region 706 that provides the most inefficient fuel consumption from the initial navigational reference point 710. Thereafter, the processing system 108 constructs a direct route 814 from that point 810 to the diversion airport 704, resulting in the updated potential diversion route 800. Again, the potential diversion route 800 traverses navigational reference points within the insufficient fuel burn zone 708 for the sake of minimizing flight time en route to the diversion airport 704 in the event that the estimated fuel consumption associated with the initial inefficient route segments 712, 812 is sufficient to result in a predicted landing weight at the end of the route 800 being less than the maximum safe landing threshold.

Turning now to FIG. 9, when the predicted landing weight at the end of the route 800 is still greater than the maximum safe landing threshold, the processing system 108 identifies another navigational reference point 910 within a viable route region 706 that provides the most inefficient fuel consumption from the navigational reference point 810 identified during the preceding iteration. Thereafter, the processing system 108 constructs a direct route 914 from that point 910 to the diversion airport 704, resulting in the iteratively updated potential diversion route 900. In response to determining the estimated fuel consumption associated with the initial inefficient route segments 712, 812, 912 is sufficient to result in a predicted landing weight at the end of the route 800 that is less than or equal to the maximum safe landing threshold, the processing system 108 generates or otherwise provides a graphical indication of the route 900 as the diversion route to be traveled by the aircraft 102 from the current position 702 en route to the diversion airport 704.

Figure 10:
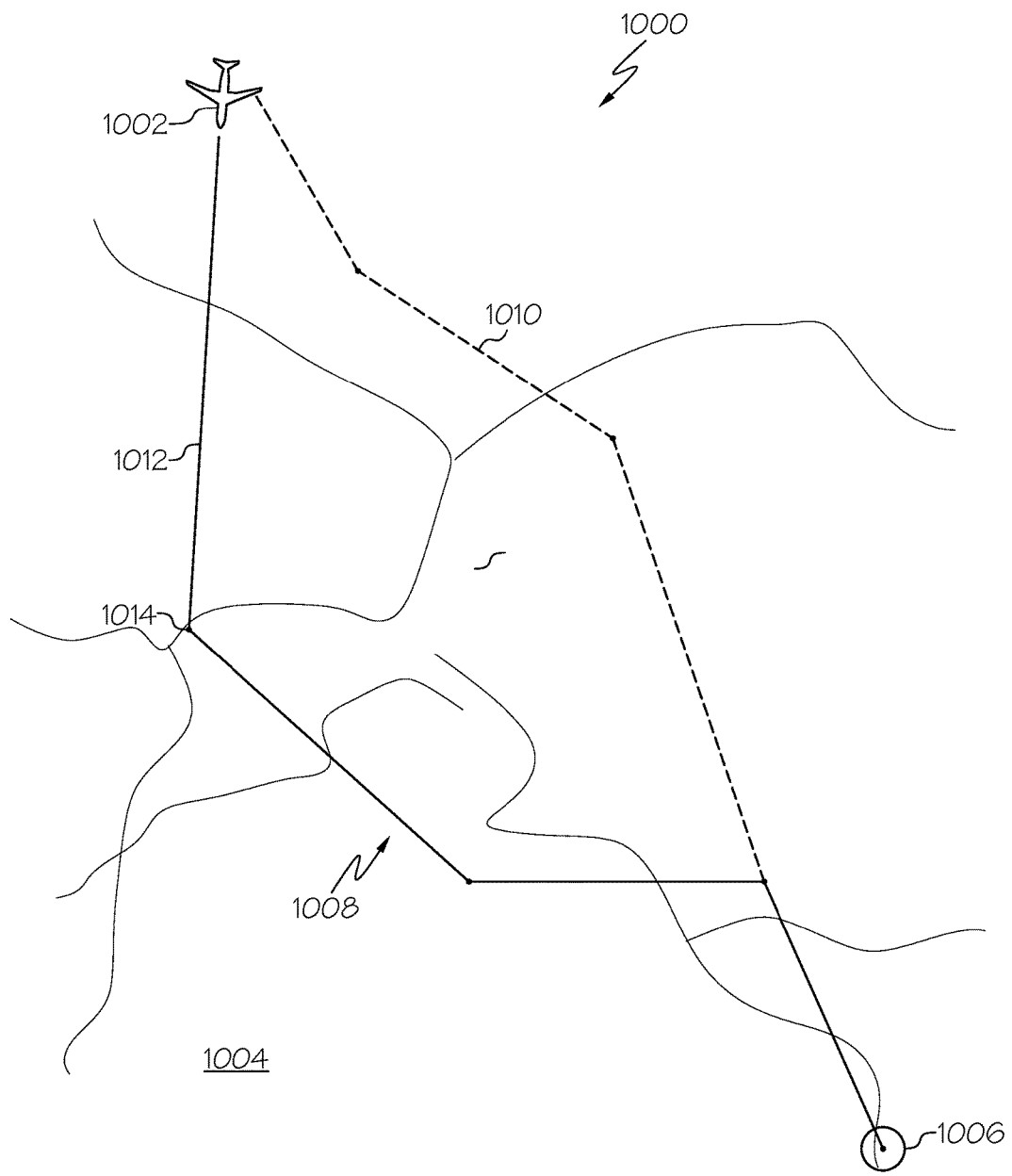
FIG. 10 depicts exemplary navigational map display suitable for display on a display device associated with the aircraft in the system of FIG. 1 in accordance with one or more embodiments of the exemplary diversion route display process of FIG. 2.

FIG. 10 depicts an exemplary navigational map display 1000 that may be displayed, rendered, or otherwise presented on the display device 104 in conjunction with the diversion route display process 200 of FIG. 2. The display system 110 and/or processing system 108 displays and/or renders the navigational map 1000 on the display device 104. The illustrated navigational map 1000 includes a graphical representation 1002 of the aircraft 102 overlaid or rendered on top of a background 1004. The background 1004 comprises a graphical representation of the terrain, topology, navigational reference points, airspace designations and/or restrictions, or other suitable items or points of interest corresponding to the currently displayed area of the navigational map 1000, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 1000 overlying the background 1004. Some embodiments of navigational map 1000 may also include graphical representations of airspace designations and/or airspace restrictions, cities, towns, roads, railroads, and other geo-political information. In addition, depending on the embodiment, the diversion route display process 200 may render other real-time flight related information that is within the geographic area corresponding to the currently displayed area of the navigational map 1000 or within a particular proximity of the aircraft, such as, for example, weather conditions, radar data, neighboring air traffic, and the like, as will be appreciated in the art. Although FIG. 10 depicts a top view (e.g., from above the aircraft 1002) of the navigational map 1000 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 1000 corresponds to the geographic area that is currently displayed in the navigational map 1000, that is, the field of view about the center location of the navigational map 1000. As used herein, the center location of the navigational map 1000 comprises a reference location for the middle or geometric center of the navigational map 1000 which corresponds to a geographic location.

In an exemplary embodiment, the navigational map 1000 is associated with the movement of the aircraft 102, and the aircraft symbology 1002 and/or background 1004 refreshes or otherwise updates as the aircraft 102 travels, such that the graphical representation of the aircraft 1002 is positioned over the terrain background 1004 in a manner that accurately reflects the current (e.g., instantaneous or substantially real-time) real-world positioning of the aircraft 102 relative to the earth. In some embodiments, the aircraft symbology 1002 is shown as traveling across the navigational map 1000 (e.g., by updating the location of the aircraft symbology 1002 with respect to the background 1004), while in other embodiments, the aircraft symbology 1002 may be located at a fixed position on the navigational map 1000 (e.g., by updating the background 1004 with respect to the aircraft graphic 1002 such that the map 1000 is maintained centered on and/or aligned with the aircraft graphic 1002). Additionally, depending on the embodiment, the navigational map 1000 may be oriented in a cardinal direction (e.g., oriented north-up so that moving upward on the map 1000 corresponds to traveling northward), or alternatively, the orientation of the navigational map 1000 may be track-up or heading-up (i.e., aligned such that the aircraft symbology 1002 is always traveling in an upward direction and the background 1004 adjusted accordingly).

In some embodiments, the map 1000 may be centered on the aircraft 1002 such that the center location of the navigational map 1000 corresponds to the current location of the aircraft 1002. In this regard, the center location of the navigational map 1000 may be updated or refreshed such that it corresponds to the instantaneous location of the aircraft 102 as the aircraft travels, as will be appreciated in the art. In alternative embodiments, the center location of the navigational map 1000 may correspond to a geographic location that is independent of the current location of the aircraft 102, for example, when a user manipulates a user input device 106 to scroll the displayed area of the navigational map or select a portion of the displayed area that does not include the aircraft symbology 1002.

The illustrated navigational map 1000 includes a graphical representation of a diversion route 1008 from the current position of the aircraft 1002 to the diversion airport 1006 that veers in a fuel inefficient direction from the current aircraft position 1002 before traversing a direct route to the diversion airport 1006. In this regard, the processing system 108 and/or display system 110 graphically indicates route segments (or airways) between navigational reference points. Rather than highlighting a direct route 1010 from the current aircraft position 1002 to the diversion airport 1006, the processing system 108 highlights an initial inefficient route segment 1012 from the current aircraft position 1002 that traverses an initial navigational reference point 1014 corresponding to the direction of most efficient fuel consumption from the current aircraft location 1002 (e.g., task 602), as well as highlighting a direct route from that navigational reference point 1014 having a minimum estimated flight time to the diversion airport 1006 (e.g., task 604).

Figure 11:
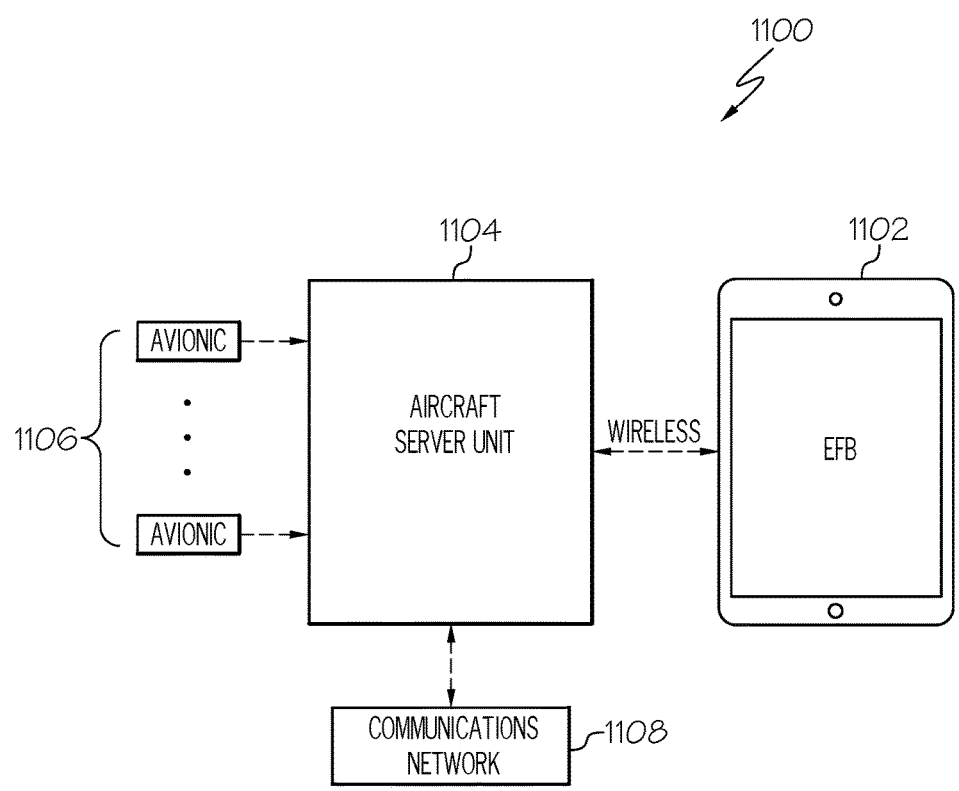
FIG. 11 depicts an exemplary embodiment of an electronic flight bag (EFB) system suitable for implementing the diversion route display process of FIG. 2 and the route construction processes of FIGS. 3 and 6 in conjunction with the aircraft system of FIG. 1 in accordance with one or more embodiments.

FIG. 11 depicts an exemplary embodiment of an electronic flight bag (EFB) system 1100 suitable for implementing the subject matter described herein. The EFB system includes an electronic device 1102 (alternatively referred to as the EFB) that is communicatively coupled to a host device 1104 that is communicatively coupled to the avionics systems 1106 onboard an aircraft (e.g., avionics systems 112, 114, 116, 118, 120). The host device 1104 generally represents a computer system configured support the processes 200, 300, 600 described herein and provide corresponding indications of the diversion route on the electronic device 1102, and for purposes of explanation, but without limitation, the host device 1104 is referred to herein as a server unit (or server). In this regard, the host server 1104 includes at least a processing system (e.g., processing system 108) and/or other hardware computing resources along with one or more data storage elements (or memory) capable of storing instructions, that, when read and executed by the processing system, cause the host server 1104 to generate or otherwise support the processes 200, 300, 600 described herein. The host server 1104 may also be coupled to a communications network 1108, which may be utilized to receive data and/or information (e.g., meteorological information, or the like) in conjunction with processes 200, 300, 600 and/or to support communications with the electronic device 1102.

In exemplary embodiments, the electronic device 1102 is realized as a laptop or notebook computer, a tablet computer, or another suitable computing device configured to provide EFB-functionality, and accordingly, the electronic device 1102 is alternatively referred to herein as an EFB. The EFB 1102 includes at least display device (e.g., display device 104) and a processing system (e.g., processing system 108 and/or display system 110), a data storage element (or memory) configured to support generating graphical representations of the diversion route or otherwise provide indications pertaining to the diversion route as described above. In this regard, the EFB 1102 may also generate or otherwise provide a navigational map (e.g., map 1000) pertaining to the operation of the aircraft.

In one or more embodiments, a pilot of the aircraft utilizes the EFB 1102 to initiate the processes 200, 300, 600 described above and input or otherwise provides the applicable safety constraints the pilot would like to be utilized when constructing the diversion route (e.g., the maximum deviation criteria at task 214). Thereafter, the EFB 1102 may transmit or otherwise provide indication of the desire to perform the diversion route display process 200 to the server 1104 along with the constraints for the diversion route. The server 1104 accesses the avionics systems 1106 and/or the communications network 1108 to receive or otherwise obtain the current position of the aircraft, the current amount of fuel remaining onboard the aircraft, the meteorological information for the region of interest encompassing the diversion airport along with the current aircraft position, and the like. Thereafter, the server 1104 identifies a diversion route resulting in a predicted safe landing weight and provides indication of the diversion route to the EFB 1102, which, in turn, generates or otherwise provides a graphical indication of the diversion route on the display of the EFB 1102 (e.g., by highlighting or rendering the diversion route 1008 overlying the terrain 1004 of a navigational map 1000 displayed by the EFB 1102). Thus, the pilot may utilize the EFB 1102 to assess or otherwise analyze the diversion route and operate the aircraft accordingly.

By virtue of the subject matter described herein, the pilot or other vehicle operator can quickly ascertain how to operate a vehicle in the event of a diversion in a manner that accounts for various safety constraints or other criteria. In the case of an aircraft, the subject matter reduces the workload on the pilot and assists the pilot in operating the aircraft to ensure a safe landing weight is achieved upon reaching the diversion airport while also attempting to minimize the flight time and/or minimizing the deviation from what would otherwise be a direct route to the diversion airport. As a result, a pilot can focus on operating the aircraft en route to the diversion airport with improved situational awareness by reducing the need for the pilot to actively manage the fuel consumption and other ancillary aspects to ensure safe landing. Current (or real-time) meteorological information as well as forecasted meteorological information, current (or real-time) configuration of the aircraft as well as predicted configurations of the aircraft, and other characteristics are also accounted for, thereby improving the performance of the diversion route. Additionally, the diversion route can be dynamically updated to account for changes to the meteorological information, changes to the aircraft configuration (e.g., a mechanical problem or the like), and the like. By reducing pilot workload in an otherwise complex situation, the pilot's situational awareness with respect to current operations is improved, which, in turn, improves safety.

For the sake of brevity, conventional techniques related to graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system comprising:
a display device to display a map associated with a vehicle;
an input device to obtain one or more constraints for diverting the vehicle;
a meteorological system to provide meteorological information; and
a second system onboard the vehicle to provide a current value for a vehicle characteristic, wherein the vehicle characteristic comprises a weight of the vehicle or a fuel remaining onboard the vehicle; and
a processing system coupled to the meteorological system, the second system, the display device and the input device to:
determine a route from a current position of the vehicle to a diversion destination based at least in part on a safety threshold for accessing the diversion destination and the one or more constraints, wherein:
the route satisfies the one or more constraints and results in a predicted value for the vehicle characteristic satisfying the safety threshold at the diversion destination; and
the predicted value for the vehicle characteristic is determined based at least in part on the current value, the route, and the meteorological information corresponding to the route; and
display a graphical representation of the route on the map.

2. The system of claim 1, wherein:
the vehicle comprises an aircraft;
the safety threshold comprises a maximum safe landing weight for the aircraft;
the processing system determines the predicted value for a fuel remaining onboard the aircraft based at least in part on a current amount of fuel remaining onboard the aircraft; and
the processing system determines the route by iteratively adjusting one or more points along the route until the predicted value for the fuel remaining onboard the aircraft results in a predicted landing weight for the aircraft satisfying the maximum safe landing weight.

3. A method of facilitating an aircraft landing at a diversion airport, the method comprising:
obtaining a current position of the aircraft;
identifying a landing threshold influenced by a characteristic of the aircraft, wherein the characteristic comprises an aircraft weight or a fuel remaining onboard the aircraft;
obtaining a current value for the characteristic of the aircraft;
obtaining one or more constraints associating with diverting to the diversion airport;
determining a route from the current position to the diversion airport based at least in part on the landing threshold and the one or more constraints, wherein the route satisfies the one or more constraints;
obtaining meteorological information corresponding to points along the route;
determining a predicted value for the aircraft based on at least in part on the current value and the meteorological information corresponding to the points along the route, wherein determining the route comprises iteratively adjusting one or more of the points along the route until the predicted value for the aircraft satisfies the landing threshold; and
displaying a graphical representation of the route on a display device.

4. The method of claim 3, further comprising identifying a viable route region comprising a plurality of navigational reference points satisfying the one or more constraints, wherein determining the route comprises identifying a sequence of navigational reference points of the plurality within the viable route region resulting in the predicted value for the aircraft satisfying the landing threshold.

5. The method of claim 4, wherein identifying the sequence comprises:
determining an initial sequence of navigational reference points of the plurality, the initial sequence defining a path from the current position to the diversion airport; and
iteratively adjusting one or more of the navigational reference points of the initial sequence until the predicted value satisfies the landing threshold.

6. The method of claim 5, wherein determining the initial sequence of navigational reference points comprises identifying the initial sequence of navigational reference points of the plurality having one of a minimum estimated flight time or a minimum distance from among potential sequences of navigational reference points of the plurality.

7. The method of claim 5, wherein determining the initial sequence of navigational reference points comprises identifying the initial sequence of navigational reference points of the plurality corresponding to a geometric mean path between the current position and the diversion airport through the viable route region.

8. The method of claim 5, wherein determining the initial sequence of navigational reference points comprises:
identifying an initial navigational reference point of the initial sequence based on a fuel consumption associated with a segment between the current position and the initial navigational reference point being greater than fuel consumption associated with respective segments between the current position and other navigational reference points of the plurality; and
identifying remaining navigational reference points of the initial sequence defining a direct route from the initial navigational reference point to the diversion airport.

9. The method of claim 8, wherein:
iteratively adjusting one or more of the navigational reference points comprises:
identifying a second navigational reference point of an updated sequence comprising the initial navigational reference point based on a second fuel consumption associated with a second segment between the initial navigational reference point and the second navigational reference point being greater than fuel consumption associated with respective segments between the initial navigational reference point and other navigational reference points of the plurality; and
identifying remaining navigational reference points of the updated sequence that define a second direct route from the second navigational reference point to the diversion airport; and
displaying the graphical representation of the route comprises graphically indicating the segment between the current position and the initial navigational reference point, the second segment between the initial navigational reference point and the second navigational reference point, and segments corresponding to the second direct route from the second navigational reference point to the diversion airport.

10. The method of claim 5, the characteristic comprising an amount of fuel onboard the aircraft, wherein iteratively adjusting one or more of the navigational reference points of the initial sequence comprises iteratively adjusting the one or more of the navigational reference points in a manner configured to increase fuel consumption.

11. The method of claim 3, wherein:
obtaining the one or more constraints comprises obtaining an allowable distance from one of the diversion airport of a direct path to the diversion airport; and
a path defined by the route is maintained within the allowable distance.

12. The method of claim 3, further comprising displaying a map on the display device, wherein the map includes a graphical representation of the aircraft at the current position, a graphical representation of the diversion airport, and the graphical representation of the route.

13. A computer-readable medium having computer-executable instructions stored thereon that, when executed by a processing system coupled to the display device, cause the processing system to perform the method of claim 3.

14. A method The method of claim 3, further comprising:
generating a viable route region comprising a plurality of navigational reference points between the aircraft and the diversion destination based at least in part on the one or more constraints, wherein determining the route comprises:
initially determining the route using the viable route region;
determining the predicted value based at least in part on the current value for the characteristic and the route; and
iteratively adjusting one or more points of the route until the predicted value satisfies the threshold.

15. The method of claim 14, further comprising:
correlating the meteorological information to the plurality of navigational reference points, wherein determining the predicted value comprises determining the predicted value based at least in part on the current value, the route, and the meteorological information correlated to points of the route.

16. A system comprising:
a display device to display a map associated with an aircraft;
an input device to obtain one or more constraints for diverting the aircraft; and
a processing system coupled to the display device and the input device to:
determine a route from a current position of the aircraft to a diversion destination based at least in part on a maximum safe landing weight for accessing the diversion destination and the one or more constraints, wherein:
the route satisfies the one or more constraints and results in a predicted value for a fuel remaining onboard the aircraft satisfying the maximum safe landing weight at the diversion destination;
the predicted value for the fuel remaining is determined based at least in part on a current amount of fuel remaining onboard the aircraft; and
the route is determined by iteratively adjusting one or more points along the route until the predicted value for the fuel remaining onboard the aircraft results in a predicted landing weight for the aircraft satisfying the maximum safe landing weight; and
display a graphical representation of the route on the map.

* * * * *